(12) United States Patent
Sengupta et al.

(10) Patent No.: US 12,306,849 B2
(45) Date of Patent: May 20, 2025

(54) SYSTEMS AND METHODS FOR DYNAMICALLY GENERATING NEW DATA RULES

(71) Applicant: Wells Fargo Bank, N.A., San Francisco, CA (US)

(72) Inventors: Shuvam Sengupta, Kolkata (IN); Rameshchandra Bhaskar Ketharaju, Hyderabad (IN); Chaya Lakshmi Paruchuri, Hyderabad (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/487,728

(22) Filed: Oct. 16, 2023

(65) Prior Publication Data

US 2025/0124042 A1    Apr. 17, 2025

(51) Int. Cl.
  *G06F 16/00*    (2019.01)
  *G06F 16/21*    (2019.01)
  (Continued)

(52) U.S. Cl.
  CPC ......... *G06F 16/254* (2019.01); *G06F 16/213* (2019.01); *G06F 16/215* (2019.01);
  (Continued)

(58) Field of Classification Search
  CPC ............... G06F 16/254; G06F 16/2365; G06F 16/2379; G06F 16/2433; G06F 16/2471;
  (Continued)

(56) References Cited

U.S. PATENT DOCUMENTS

| | | | |
|---|---|---|---|
| 8,918,677 B1 * | 12/2014 | Marokhovsky | G06F 11/0751 714/100 |
| 10,853,739 B2 * | 12/2020 | Truong | G06N 3/045 |

(Continued)

FOREIGN PATENT DOCUMENTS

| | | | |
|---|---|---|---|
| EP | 3828777 A1 * | 6/2021 | |
| EP | 4030349 A1 * | 7/2022 | |

(Continued)

OTHER PUBLICATIONS

Lamghari Zineb et al., "ETL Technologies for Big Data: A Comparative Study", 2023 IEEE International Conference on Advances in Data-Driven Analytics And Intelligent Systems (ADACIS), pp. 1-6.*

(Continued)

*Primary Examiner* — Srirama Channavajjala
(74) *Attorney, Agent, or Firm* — K&L Gates LLP

(57) ABSTRACT

Systems, apparatuses, methods, and computer program products are disclosed for dynamically generating a new data rule. An example method includes receiving a data rule including an operation to be applied to a data entry and determining regarding whether the data rule belongs to a set of previously-reviewed data rules. The example method further includes, when the data rule does not belong to the set of previously-reviewed data rules, providing the data rule to a user for human validation and receiving human validation. The example method further includes, causing an update, by rule generation circuitry, of an element of a machine learning model, where the element corresponds to the data rule where the update changes a weight value based on the validation and generating the new data rule based on the updated machine learning model. The example method further includes replacing the data rule with the new data rule.

19 Claims, 7 Drawing Sheets

(51) Int. Cl.
  *G06F 16/215* (2019.01)
  *G06F 16/23* (2019.01)
  *G06F 16/242* (2019.01)
  *G06F 16/2458* (2019.01)
  *G06F 16/25* (2019.01)
  *G06N 3/042* (2023.01)
  *G06N 3/08* (2023.01)
  *G06N 5/025* (2023.01)
  *G06N 20/00* (2019.01)

(52) U.S. Cl.
  CPC ...... *G06F 16/2365* (2019.01); *G06F 16/2379* (2019.01); *G06F 16/2433* (2019.01); *G06F 16/2471* (2019.01); *G06N 3/042* (2023.01); *G06N 3/08* (2013.01); *G06N 5/025* (2013.01); *G06N 20/00* (2019.01)

(58) Field of Classification Search
  CPC .... G06F 16/213; G06F 16/212; G06F 16/215; G06N 5/025; G06N 7/02; G06N 20/00; G06N 3/042; G06N 3/08; G05B 2219/25428–25429
  See application file for complete search history.

(56) References Cited

U.S. PATENT DOCUMENTS

| | | | | |
|---|---|---|---|---|
| 11,281,975 | B1* | 3/2022 | Isaksson | G06F 3/0486 |
| 11,710,029 | B2* | 7/2023 | Ooi | G06N 3/08 |
| | | | | 706/25 |
| 11,886,403 | B1* | 1/2024 | Serena | G06F 16/2365 |
| 11,907,243 | B2* | 2/2024 | Gimple | G06F 16/2471 |
| 11,907,719 | B2* | 2/2024 | Langhammer | G06F 7/556 |
| 11,941,016 | B2* | 3/2024 | Jones | G06F 16/254 |
| 11,947,559 | B1* | 4/2024 | Arumugam Maharaja | G06F 16/212 |
| 12,086,153 | B1* | 9/2024 | Kannan | G06F 16/213 |
| 2018/0032914 | A1 | 2/2018 | Vigoda | |
| 2018/0189332 | A1* | 7/2018 | Asher | G06F 16/215 |
| 2020/0012584 | A1 | 1/2020 | Walters | |
| 2020/0026710 | A1 | 1/2020 | Przada | |
| 2020/0027033 | A1* | 1/2020 | Garg | G06F 17/18 |
| 2020/0380416 | A1 | 12/2020 | Zion | |
| 2022/0043826 | A1* | 2/2022 | Zorin | G06F 16/24573 |
| 2022/0121675 | A1* | 4/2022 | Natani | G06F 21/6218 |
| 2022/0237441 | A1* | 7/2022 | Soler Garrido | G06N 3/042 |
| 2022/0261413 | A1 | 8/2022 | Jones | |
| 2022/0405590 | A1* | 12/2022 | Hebets | G06N 20/00 |
| 2023/0177121 | A1* | 6/2023 | Bhattacharya | G06V 10/776 |
| | | | | 706/62 |
| 2023/0222113 | A1* | 7/2023 | Singh | G06F 16/2379 |
| | | | | 707/607 |
| 2023/0368110 | A1* | 11/2023 | Dharmavaram | G06F 16/2465 |

FOREIGN PATENT DOCUMENTS

| | | | |
|---|---|---|---|
| WO | WO2020122669 A1 * | 6/2020 | |
| WO | WO2021044241 A1 * | 3/2021 | |

OTHER PUBLICATIONS

Huamin Wang et al., "An ETL Services Framework Based on Metadata", 2010 2nd International Workshop on Intelligent Systems and Applications (2010, pp. 1-4).*

Derrick C. Spell et al., "QED: Groupon's ETL management and curated feature catalog system for machine learning", 2016 IEEE International Conference on Big Data (Big Data) (2016, pp. 1639-1646).*

* cited by examiner

SYSTEMS AND METHODS FOR DYNAMICALLY GENERATING NEW DATA RULES

BACKGROUND

Extract-transform-load (ETL) and extract-load-transform (ELT) are processes by which data is first extracted from potentially disparate sources, transformed by homogenizing, cleaning, infilling, or the like, and loaded to a data warehouse or other destination for data. Today's ETL/ELT processes are often generic and rules-based, and performed without regard to how data is consumed downstream.

BRIEF SUMMARY

As described above, ETL/ELT processes tend to be generic and rules-based, and therefore do not take advantage of the specific ways that data is consumed downstream. Even in cases where automated ETL/ELT processes are used, these processes are often a reflection of sets of manually written rules intended to fix gaps in data. Organizations may struggle to update and maintain sets of manually-written rules that are constantly growing in size and complexity. As these processes become more unwieldly, their existence may continue to be justified only by sunk cost or the difficulty of replicating their functionality in a new system.

There is thus a need to replace existing ETL/ELT processes based primarily on manual intervention with new systems and methods that can, directly and in real time, identify how a particular data element or gap in data will impact the final consumption of data. A supervised machine learning (ML) driven ETL process may fill the need for such systems.

Example embodiments described herein use supervised ML-driven ETL processes that are trained on existing models and feed information back into the ETL process to improve data quality. Example embodiments also incorporate a human-in-the-loop element via a prompt to annotators to provide input regarding the data quality of an element to provide an additional method for continual improvement of the disclosed ML techniques. Example embodiments may automate the generation of new rules learned from ingested models and human inputs.

Accordingly, the present disclosure sets forth systems, methods, and apparatuses that improve quality and automation of ETL/ELT systems. There are many advantages of these and other embodiments described herein. For instance, example embodiments prioritize the final usage of data elements in the ETL/ELT process. As mentioned above, today's ETL/ELT processes typically may not account for the downstream usage of data, but due to improvements of the innovations disclosed herein, data rules may be generated and maintained for more specific contexts, and input may be provided from downstream users and/or processes. In addition, example embodiments have universal applicability in autonomous systems and machines. While legacy ETL/ELT processes may be preserved in certain fixed or legacy systems, innovations disclosed herein may act as a layer of abstraction with more flexible systems designed to be upgraded and modified at will.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

DETAILED DESCRIPTION

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" refers to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" refers to any computing device capable of functioning as a server, such as a master exchange server, web server, mail server, document server, or any other type of server. A server may be a dedicated computing device or a server module (e.g., an application) hosted by a computing device that causes the computing device to operate as a server.

The term "data rule" refers to an operation to be applied to a data entry. In some embodiments, the data rule may belong to an ETL process. In some embodiments, the data rule may be an extract rule, for example, a rule for retrieving, cleaning, formatting, parsing, or other processes for extracting data from disparate sources. In some embodiments, the data rule may be a transform rule or a transformation, for example, performing calculations, selections, concatenation, sorting, pivoting, or any other such data operation that selects and/or modifies data to be prepared for loading. In some embodiments, the data rule may be a load rule, for example, adding date or time stamps, reformatting, padding data, converting to or from a binary format to a text format, or the like. In some embodiments, data rules may combine elements of extract, transform, and/or load rules. The data rule may be expressed as computer instructions, for example as a scripting language, compiled binary computer instructions, or the like. In some embodiments, the data rule may be expressed as a macro or formula, for example, as part of a spreadsheet entry.

System Architecture

Figure 1:
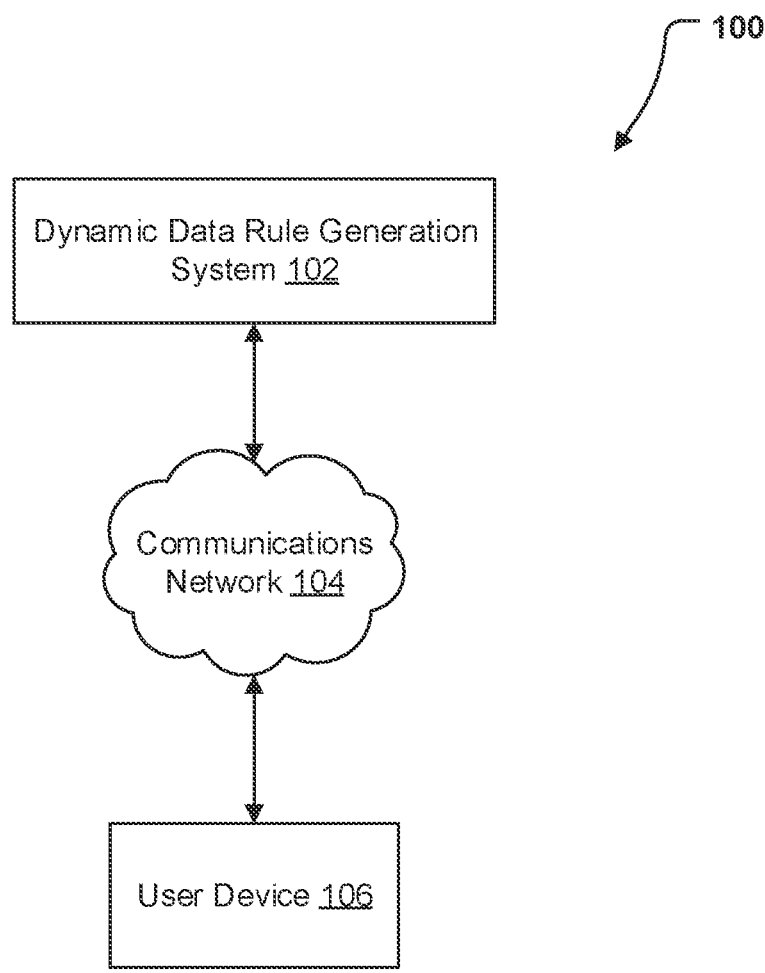
FIG. 1 illustrates a system in which some example embodiments may be used to automatically generate new data rules.

Example embodiments described herein may be implemented using any of a variety of computing devices or servers. To this end, FIG. 1 illustrates an example environment 100 within which various embodiments may operate. As illustrated, a dynamic data rule generation system 102 may receive and/or transmit information via communications network 104 (e.g., the Internet) with any number of other devices, such as user device 106.

The dynamic data rule generation system 102 may be implemented as one or more computing devices or servers, which may be composed of a series of components. Particular components of the dynamic data rule generation system 102 are described in greater detail below with reference to apparatus 200 in connection with FIG. 2.

The user device 106 may be embodied by any computing devices known in the art. The user device 106 need not itself be an independent device, but may be one or more peripheral devices communicatively coupled to other computing devices. In some embodiments, the dynamic data rule generation system 102 may not directly interface with user input or output, and may rely on the user device 106 for providing human validation on data rules, for receiving results and output information from the dynamic data rule generation system 102, or the like. In some embodiments, the user may directly interact with the dynamic data rule generation system 102, for example, for initial setup, debugging, maintenance, and the like.

Example Implementing Apparatuses

Figure 2:
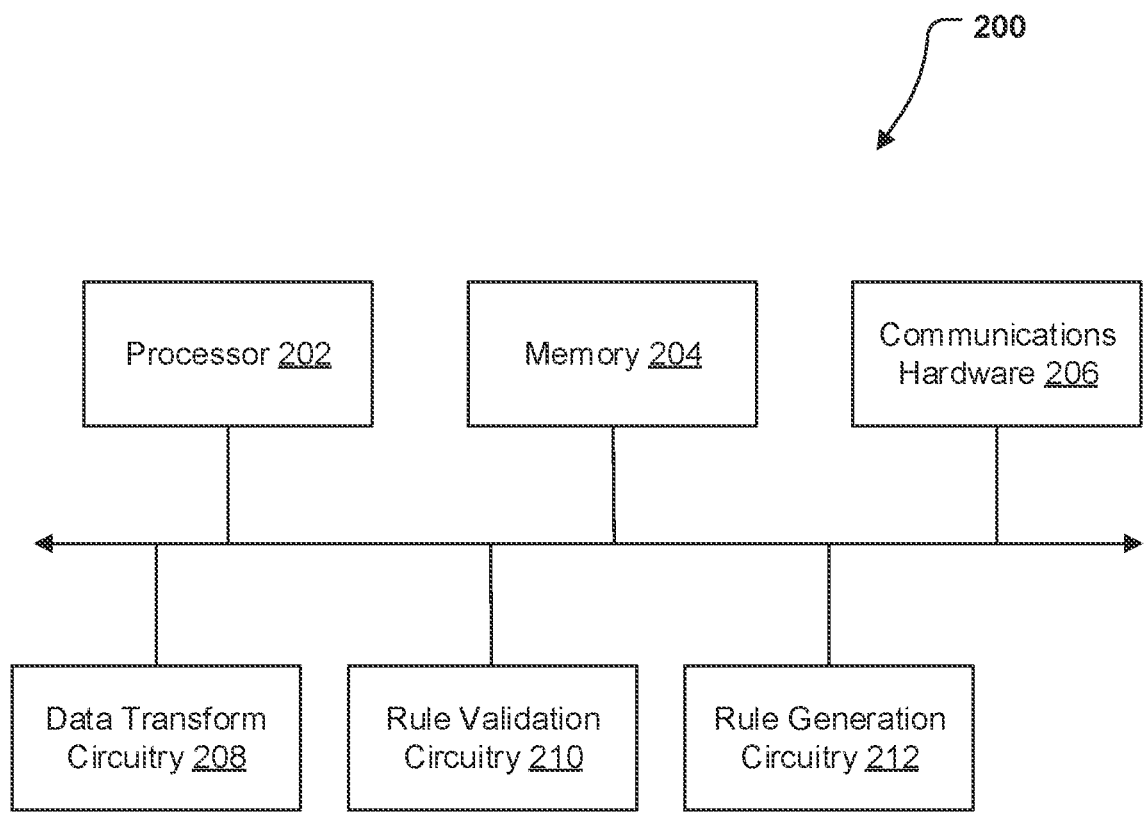
FIG. 2 illustrates a schematic block diagram of example circuitry embodying a system device that may perform various operations in accordance with some example embodiments described herein.

The dynamic data rule generation system 102 (described previously with reference to FIG. 1) may be embodied by one or more computing devices or servers, shown as apparatus 200 in FIG. 2. The apparatus 200 may be configured to execute various operations described above in connection with FIG. 1 and below in connection with FIGS. 3-7B. As illustrated in FIG. 2, the apparatus 200 may include processor 202, memory 204, communications hardware 206, data transform circuitry 208, rule validation circuitry 210, and rule generation circuitry 212, each of which will be described in greater detail below.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor. In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications hardware 206 may be any means such as a device or circuitry embodied in either hardware or a combination of hardware and software that is configured to receive and/or transmit data from/to a network and/or any other device, circuitry, or module in communication with the apparatus 200. In this regard, the communications hardware 206 may include, for example, a network interface for enabling communications with a wired or wireless communication network. For example, the communications hardware 206 may include one or more network interface cards, antennas, buses, switches, routers, modems, and supporting hardware and/or software, or any other device suitable for enabling communications via a network. Furthermore, the communications hardware 206 may include the processing circuitry for causing transmission of such signals to a network or for handling receipt of signals received from a network.

The communications hardware 206 may further be configured to provide output to a user and, in some embodiments, to receive an indication of user input. In this regard, the communications hardware 206 may comprise a user interface, such as a display, and may further comprise the components that govern use of the user interface, such as a web browser, mobile application, dedicated client device, or the like. In some embodiments, the communications hardware 206 may include a keyboard, a mouse, a touch screen, touch areas, soft keys, a microphone, a speaker, and/or other input/output mechanisms. The communications hardware 206 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises a data transform circuitry 208 that receives a data rule, replaces a data rule with a new data rule, may add a data rule to an ETL process, and may discard a data rule. The data transform circuitry 208 may utilize processor 202, memory 204, or any other hardware component included in the apparatus 200 to perform these operations, as described in connection with FIGS. 3-7B below. The data transform circuitry 208 may further utilize communications hardware 206 to gather data from a variety of sources (e.g., user device 106, as shown in FIG. 1), and/or exchange data with a user, and in some embodiments may utilize processor 202 and/or memory 204 to manipulate and track data rules.

In addition, the apparatus 200 further comprises a rule validation circuitry 210 that provides a data rule to a user for human validation, receives an indication of human validation from the user, may add a data rule to a set of previously-reviewed data rules, may add a validation decision to a set of previously reviewed data rule validation decisions, may locate a validation decision in the set of previously reviewed data rule validation decisions, and may apply a validation decision to a data rule. The rule validation circuitry 210 may utilize processor 202, memory 204, or any other hardware component included in the apparatus 200 to perform these operations, as described in connection with FIGS. 3-7B below. In some embodiments, the rule validation circuitry may comprise a field-programmable gate array (FPGA), for example, in embodiments in which rapid real-time generation of data rules is required. The rule validation circuitry 210 may further utilize communications hardware 206 to gather data from a variety of sources (e.g., user device 106, as shown in FIG. 1), and/or exchange data with a user, and in some embodiments may utilize processor 202 and/or memory 204 to perform validation of data rules.

Further, the apparatus 200 further comprises a rule generation circuitry 212 that causes an update of an element of a machine learning model, generates a new data rule based on the updated machine learning model, may train the machine learning model using existing data rules from existing ETL processes, may modify the machine learning model based on quality scores and a set of ETL processes, and may determine that a new data rule does or does not pass a confidence threshold. The rule generation circuitry 212 may utilize processor 202, memory 204, or any other hardware component included in the apparatus 200 to perform these operations, as described in connection with FIGS. 3-7B below. The rule generation circuitry 212 may further utilize communications hardware 206 to gather data from a variety of sources (e.g., user device 106, as shown in FIG. 1), and/or exchange data with a user, and in some embodiments may utilize processor 202 and/or memory 204 to generate data rules.

Although components 202-214 are described in part using functional language, it will be understood that the particular implementations necessarily include the use of particular hardware. It should also be understood that certain of these components 202-214 may include similar or common hardware. For example, the data transform circuitry 208, rule validation circuitry 210, and rule generation circuitry 212 may each at times leverage use of the processor 202, memory 204, or communications hardware 206, such that duplicate hardware is not required to facilitate operation of these physical elements of the apparatus 200 (although dedicated hardware elements may be used for any of these components in some embodiments, such as those in which enhanced parallelism may be desired). Use of the term "circuitry" with respect to elements of the apparatus therefore shall be interpreted as necessarily including the particular hardware configured to perform the functions associated with the particular element being described. Of course, while the term "circuitry" should be understood broadly to include hardware, in some embodiments, the term "circuitry" may in addition refer to software instructions that configure the hardware components of the apparatus 200 to perform the various functions described herein.

Although the data transform circuitry 208, rule validation circuitry 210, and rule generation circuitry 212 may leverage processor 202, memory 204, or communications hardware 206 as described above, it will be understood that any of data transform circuitry 208, rule validation circuitry 210, and rule generation circuitry 212 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or communications hardware 206 for enabling any functions not performed by special-purpose hardware. In all embodiments, however, it will be understood that data transform circuitry 208, rule validation circuitry 210, and rule generation circuitry 212 comprise particular machinery designed for performing the functions described herein in connection with such elements of apparatus 200.

In some embodiments, various components of the apparatus 200 may be hosted remotely (e.g., by one or more cloud servers) and thus need not physically reside on the corresponding apparatus 200. For instance, some components of the apparatus 200 may not be physically proximate to the other components of apparatus 200. Similarly, some or all of the functionality described herein may be provided by third party circuitry. For example, a given apparatus 200 may access one or more third party circuitries in place of local circuitries for performing certain functions.

As will be appreciated based on this disclosure, example embodiments contemplated herein may be implemented by an apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, DVDs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of example apparatus 200, example embodiments are described below in connection with a series of flowcharts.

Example Operations

Turning to FIGS. 3-7B, example flowcharts are illustrated that contain example operations implemented by example embodiments described herein. The operations illustrated in FIGS. 3-7B may, for example, be performed by the dynamic data rule generation system 102 shown in FIG. 1, which may in turn be embodied by an apparatus 200, which is shown and described in connection with FIG. 2. To perform the operations described below, the apparatus 200 may utilize one or more of processor 202, memory 204, communications hardware 206, data transform circuitry 208, rule validation circuitry 210, rule generation circuitry 212 and/or any combination thereof. It will be understood that user interaction with the dynamic data rule generation system 102 may occur directly via communications hardware 206, or may instead be facilitated by a separate user device 106, as shown in FIG. 1, and which may have similar or equivalent physical componentry facilitating such user interaction.

Figure 3:
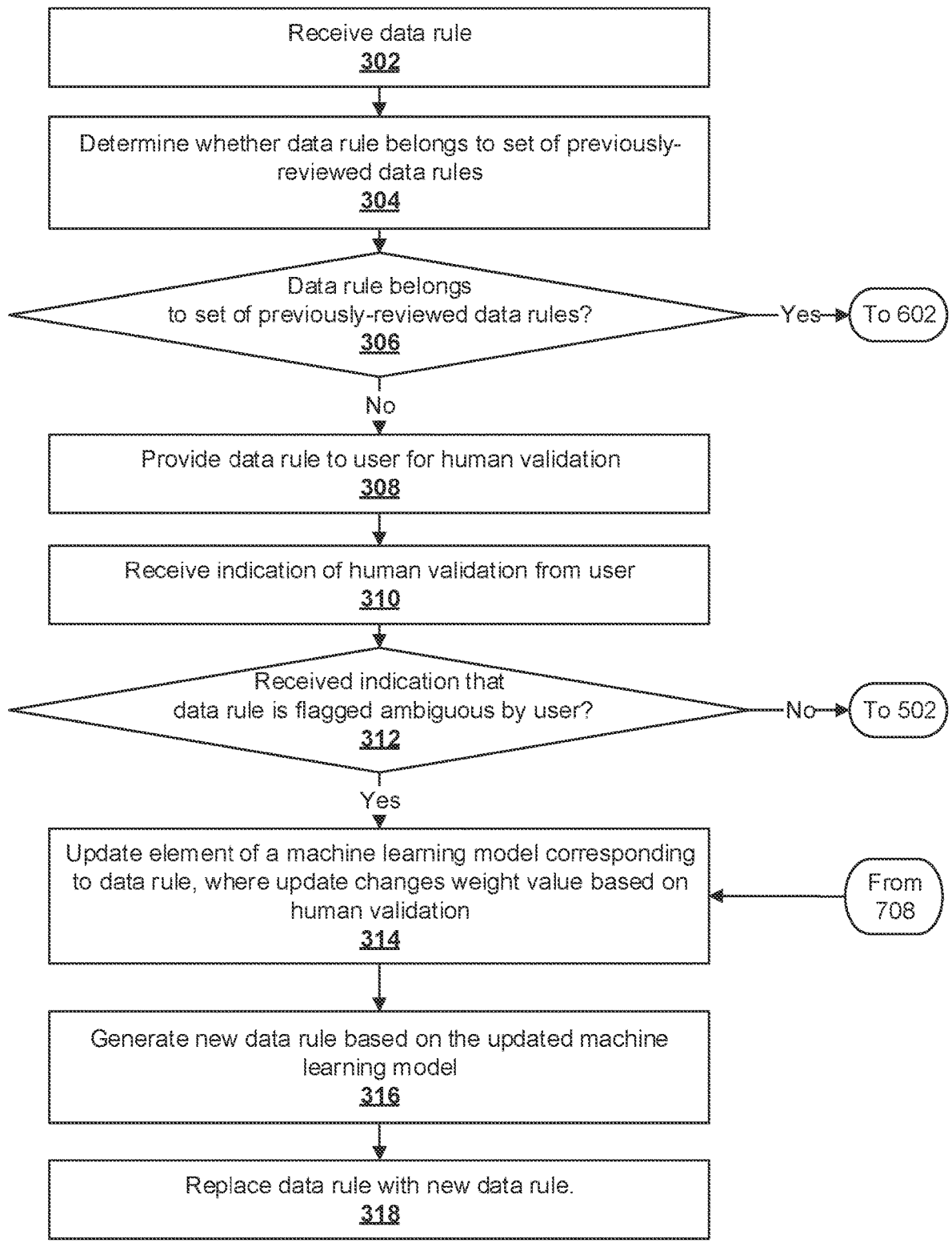
FIG. 3 illustrates an example flowchart for automatically generating new data rules, in accordance with some example embodiments described herein.

Turning first to FIG. 3, example operations are shown for automatically generating new data rules. As shown by operation 302, the apparatus 200 includes means, such as processor 202, memory 204, communications hardware 206, data transform circuitry 208, or the like, for receiving a data rule. The communications hardware 206 may receive the data rule directly, such as by user input, or by the use of attached hardware. The data transform circuitry 208 may directly receive the rule, or may communicate with communications hardware 206, which in turn may receive the data rule locally from a user. Alternatively, the data rule may be transmitted from a remote device, such as user device 106 or the like. In some embodiments, the data rule may be retrieved from remote or local storage (such as memory 204) and received via the communications hardware 206 and/or directly by the data transform circuitry 208.

The data rule may include an operation to be applied to a data entry, such as a transformation, a loading operation, or an extraction operation. In some embodiments, the data rule may belong to an ETL process. In some embodiments, the data rule may be an extract rule, for example, a rule for retrieving, cleaning, formatting, parsing, or other processes for extracting data from disparate sources. In some embodiments, the data rule may be a transform rule or a transformation, for example, performing calculations, selections, concatenation, sorting, pivoting, or any other such data operation that selects and/or modifies data to be prepared for loading. In some embodiments, the data rule may be a load rule, for example, adding date or time stamps, reformatting, padding data, converting to or from a binary format to a text format, or the like. In some embodiments, data rules may combine elements of extract, transform, and/or load rules.

The data rule may be expressed as computer instructions, for example as a scripting language, compiled binary computer instructions, or the like. In some embodiments, the data rule may be expressed as a macro or formula, for example, as part of a spreadsheet entry.

As shown by operation 304, the apparatus 200 includes means, such as processor 202, memory 204, communications hardware 206, rule validation circuitry 210, or the like, for making a determination regarding whether the data rule belongs to a set of previously-reviewed data rules. The rule validation circuitry 210 may analyse the data rule and compare the data rule to a set of previously reviewed data rules. In some embodiments, the rule validation circuitry 210 may check that the computer instructions forming the data rule are identical to the computer instructions of the previously reviewed rule. In some embodiments, the rule validation circuitry may make a more sophisticated test, for example, by running test data through the data rule and the previously reviewed rule to compare the effects of the data rule on sample data (e.g., to account for instances in which two data rules with different computer code produce the same output for the same given inputs). The rule validation circuitry 210 may use unit tests, static code analysis, or other techniques to determine if the data rule matches a rule from the set of previously reviewed data rules.

As shown by decision block 306, control may flow to operation 602 or operation 308 depending on a determination of if the data rule belongs to a set of previously-determined data rules. If the rule validation circuitry 210 determines that the data rule does belong to the set of previously-determined data rules, the method may move to operation 602, and avoid human-in-the-loop intervention. If the rule validation circuitry 210 determines that the data rule does not belong to the set of previously-determined data rules, human interaction may be initiated by moving to operation 308.

As shown by operation 308, the apparatus 200 includes means, such as processor 202, memory 204, communications hardware 206, rule validation circuitry 210 or the like, for, in an instance in which the determination indicates that the data rule does not belong to the set of previously-reviewed data rules, providing the data rule to a user for human validation. The rule validation circuitry may directly provide the rule, or may communicate with communications hardware 206, which in turn may provide the data rule locally to a user or the data rule may be transmitted to a remote device, such as user device 106 or the like. In some embodiments, the data rule may be sent to remote or local storage (such as memory 204) and subsequently provided immediately or at a later time via the communications hardware 206 and/or directly by the rule validation circuitry 210.

As shown by operation 310, the apparatus 200 includes means, such as processor 202, memory 204, communications hardware 206, rule validation circuitry 210, or the like, for receiving an indication of human validation from the user. As described above in connection with operation 308, the rule validation circuitry 210 may directly receive indication of human validation from the use, or may communicate with communications hardware 206, which in turn may receive the indication locally from the user.

In some embodiments, the indication of human validation may be "valid," "invalid," or "ambiguous." The indication of human validation may reflect the annotator or user's judgement of the quality of the data rule, applying annotation to the data rule. If the user is unable to reach a conclusion, or would require more time than is available to judge the quality of the data rule, the "ambiguous" indication may be provided to allow the dynamic data rule generation system 102 to automate the process of updating the rule, as described in the further operations of FIGS. 3-7A below.

Following operation 310, the apparatus 200 may include means, such as processor 202, memory 204, communications hardware 206, rule generation circuitry 212, or the like, for performing, based on the indication of human validation, an optimization operation using the new data rule. Example implementations of the optimization operation are described below by decision block 312 and subsequent operations (e.g., operations 314-318 and 502-508). The optimization operation may depend largely on the content of the indication of human validation. The optimization operation may execute based on, for example, an indication that the data rule is ambiguous, valid, or invalid, may trigger various example operations (e.g., see decision blocks 312, 502, and 506).

As shown by decision block 312, control may flow to decision block 502 or operation 314 depending on the content of the indication of human validation received. In an instance in which the indication of human validation is "ambiguous," the method may move to operation 314. In an instance in which the indication of human validation is any other indication, the method may pass to decision block 502, shown in FIG. 5, where a subsequent decision may be made based on the indication of human validation.

As shown by operation 314, the apparatus 200 includes means, such as processor 202, memory 204, communications hardware 206, rule generation circuitry 212, or the like, for, in an instance in which the human validation identifies the rule as ambiguous, causing an update of an element of a machine learning model. The element of the machine learning model may correspond to the data rule, and the update may change a weight value based on the indication of human validation.

The machine learning model may be a computer method that employs artificial intelligence or machine learning to classify and/or generate data. The machine learning model may be any such method or algorithm known in the art, broadly including decision trees, neural networks, support vector machines, or the like. The machine learning model may be trained using supervised training, unsupervised training, reinforcement learning, or a hybrid approach, ingesting labelled and/or unlabelled training data. The machine learning model may have a number of hyperparameters depending on the particular model and implementation, for example a neural network may have hyperparameters such as the number of layers, number of nodes per layer, learning rate, and the like. Machine learning models may be generative, such as a generative adversarial network or generative pre-trained transformer. The machine learning model may have a general architecture, or may be tuned and specialized for a particular domain of application (e.g., image processing, language processing, video, audio, etc.).

The rule generation circuitry 212 may update the element of the machine learning model corresponding to the data rule, for example, by adding or changing a label to a training dataset, adding the data rule to a training dataset, or modifying one or more internal parameters of the machine learning model. The update to the machine learning model may trigger processing of the training data when the machine learning model is trained or updated using the newly updated information provided by the rule generation circuitry 212.

As shown by operation 316, the apparatus 200 includes means, such as processor 202, memory 204, communications hardware 206, rule generation circuitry 212, or the like, for, in an instance in which the human validation identifies the rule as ambiguous, generating the new data rule based on the updated machine learning model. As described above, the rule generation circuitry 212 may trigger processing of the training data when the machine learning model is trained or updated using the newly updated information provided by the rule generation circuitry 212 in connection with operation 314. Using the updated machine learning model, a new data rule may be generated. For example, a new random number may be chosen and given to the machine learning model as a seed to generate one or more new data rules. In some embodiments, the new data rule may be required to pass certain conditions, as shown in connection with FIG. 7B. The new data rule may itself be transformed from the format received by the machine learning model to a format that may be implemented by the data transform circuitry 208.

Finally, as shown by operation 318, the apparatus 200 includes means, such as processor 202, memory 204, communications hardware 206, data transform circuitry 208, or the like, for replacing the data rule with the new data rule. The data transform circuitry 208 may validate and/or test the new data rules, including compiling the data rule if a compiled binary is deployed. The data transform circuitry may deploy the new data rule, removing the data rule (the old data rule that was indicated to be ambiguous by the user). Deploying the new data rule may involve updating code and recompiling, deploying a script, binary, or macro to a production server. In some embodiments, the data transform circuitry may perform any finalization steps, including cleaning, formatting, compiling, or the like, that are needed to deploy the new data rule and replace the old data rule. The data transform circuitry may deploy the new data rule via the communications hardware 206, in embodiments in which the data rules are deployed to a remote server device. In some embodiments, the data transform circuitry 208 may deploy the new data rule to an ETL framework, and may take steps to validate the new data rule and ensure compliance within the ETL framework, in addition to performing any extra steps related to the ETL framework needed to deploy the new data rule.

Figure 4:
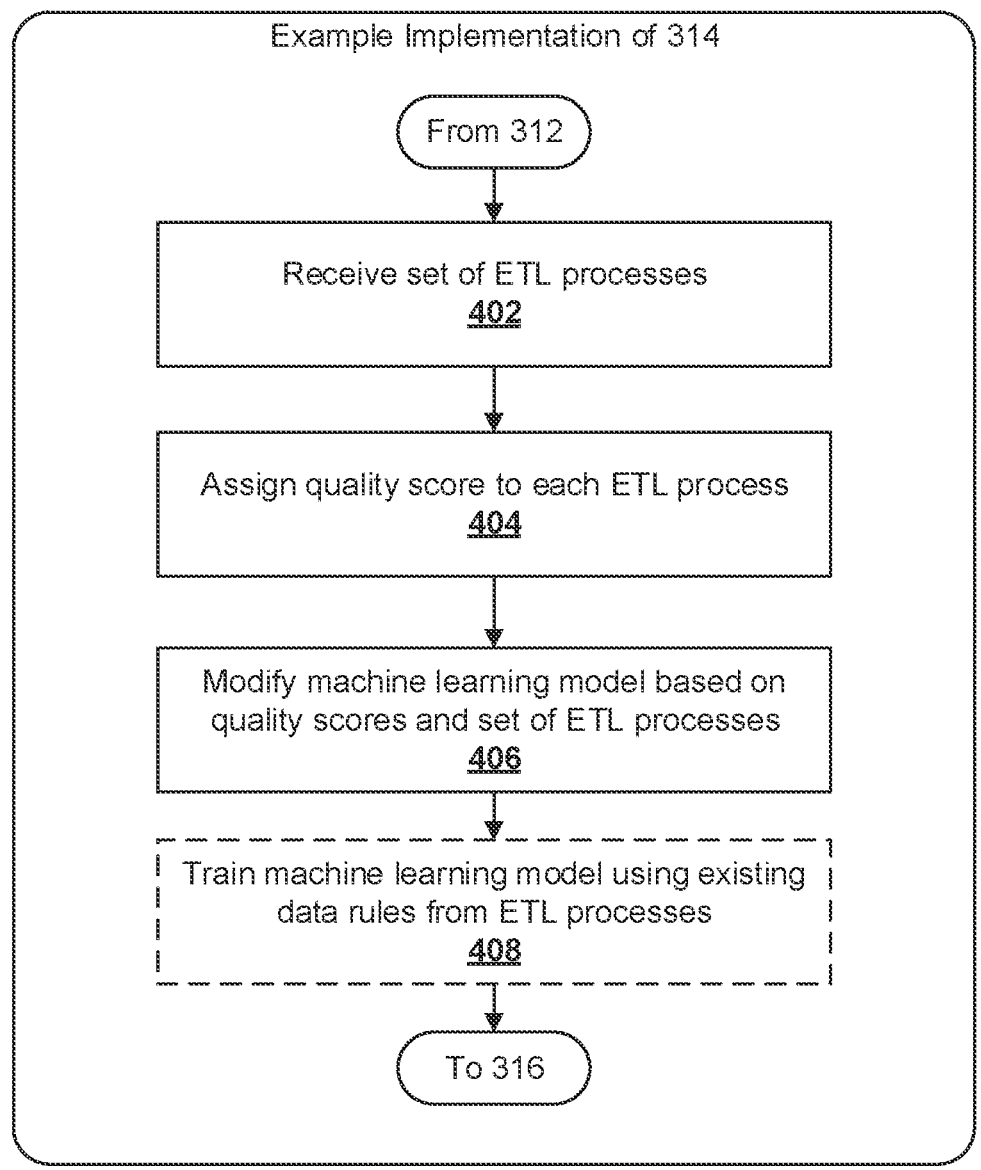
FIG. 4 illustrates an example flowchart for causing an update of an element of a machine learning model, in accordance with some example embodiments described herein.

In some embodiments, operation 314 may be performed in accordance with the operations described by FIG. 4. Turning now to FIG. 4, example operations are shown for causing an update of an element of a machine learning model. As shown by operation 402, the apparatus 200 includes means, such as processor 202, memory 204, communications hardware 206, rule generation circuitry 212, or the like, for receiving a set of ETL processes. The rule generation circuitry 212 may directly receive the set of ETL processes, or may communicate with communications hardware 206, which in turn may receive the set of ETL processes locally from a user. Alternatively, the set of ETL processes may be transmitted from a remote device, such as user device 106 or the like. In some embodiments, the set of ETL processes may be retrieved from remote or local storage (such as memory 204) and received via the communications hardware 206 and/or directly by the rule generation circuitry 212.

The set of ETL processes may comprise a number of data rules, where each data rule is an extract, transform, and/or load rule. The ETL processes may each have a source and destination data storage element for which they are intended, or each ETL process may have a broader category of source and destination data storage elements. The set of ETL processes may be received in any of a variety of formats, such as non-compiled computer code, spreadsheet formulas, scripts, macros, or the like, for example. In some embodiments, the rule generation circuitry 212 may receive and/or collect a collection of ETL processes and identify processes and/or rules that relate to a particular data element of interest.

As shown by operation 404, the apparatus 200 includes means, such as processor 202, memory 204, communications hardware 206, rule generation circuitry 212, or the like, for assigning a quality score to each ETL process from the set of ETL processes. The rule generation circuitry 212 may receive and/or determine the quality score based on data quality of data produced from the ETL process, and may utilize a variety of sources and/or methods to make the data quality determination. In some embodiments, the quality score may be a data quality assigned by a user through manual intervention. The user-assigned data quality or quality score may be a qualitative assessment or a quantitative assessment. The data quality may be determined based on the internal consistency of the data, the degree to which it represents the intended real-life concepts, fitness for use in the intended application, and/or other factors. In some embodiments, an algorithmic process may determine the data quality or quality score for each ETL process. For example, static code analysis or a rules based checklist may prepare a quantitative assessment of the quality score for a given ETL process and its constituent data rules.

As shown by operation 406, the apparatus 200 includes means, such as processor 202, memory 204, communications hardware 206, rule generation circuitry 212, or the like, for modifying the machine learning model based on the quality scores and the set of ETL processes. The rule generation circuitry 212 may modify the machine learning model, for example, by modifying the training dataset of the machine learning model using the set of ETL processes as a training dataset. In some embodiments, the quality scores and the set of ETL processes may constitute a labeled training dataset for supervised learning. In some embodiments, the rule generation circuitry 212 may provide the quality scores and the set of ETL processes to the machine learning model after cleaning, infilling, labeling, or otherwise preparing the data to be provided as input to the machine learning model.

As shown by operation 408, the apparatus 200 may include means, such as processor 202, memory 204, communications hardware 206, rule generation circuitry 212, or the like, for training the machine learning model using existing data rules from existing ETL processes. The rule generation circuitry 212 may train the machine learning model, for example, by using the modified training dataset of the machine learning model which uses the set of ETL processes as a training dataset, as described above in connection with operation 406. The rule generation circuitry 212 may activate the machine learning model in training mode, such that the internal parameters of the model may be adjusted according to the quality scores and the set of ETL processes of the training dataset. In some embodiments, some of the available data may be designated for training purposes, while other data is reserved for testing, to reduce the effect of overtraining on the machine learning model. The rule generation circuitry 212 may use various criteria to divide the available data for training and testing purposes, in some embodiments repeating the training and testing process to create a machine learning model that is more robust against overtraining.

Figure 5:
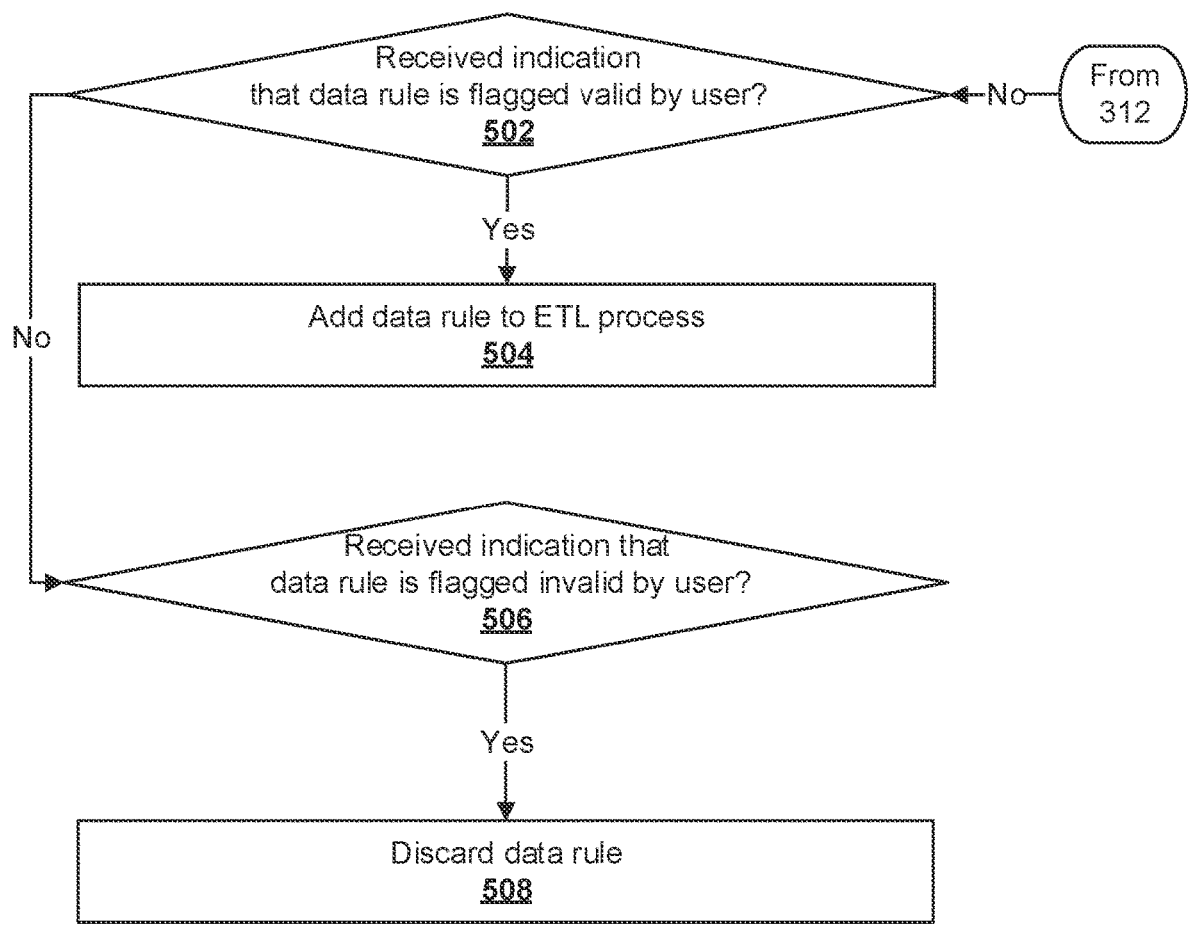
FIG. 5 illustrates another example flowchart for modifying an ETL process in an instance in which the human validation indicates a data rule is ambiguous, in accordance with some example embodiments described herein.

Turning now to FIG. 5, example operations are shown for modifying an ETL process in an event in which a data rule is not flagged as ambiguous by a user. As shown by decision block 502, control may flow to operation 504 or decision block 506 depending on a determination of whether the data rule is flagged as valid by the user. The indication of human validation may be received, for example, at operation 310, described in connection with FIG. 3. In an instance in which the indication of human validation is received and the data rule is flagged as valid by the user, control may move to operation 504. In an instance in which the indication of human validation is received and the data rule is flagged as invalid by the user, control may move to decision block 506 and ultimately to operation 508.

As shown by operation 504, the apparatus 200 includes means, such as processor 202, memory 204, communications hardware 206, data transform circuitry 208, or the like, for, in an instance in which the human validation identifies the rule as valid, adding the data rule to the ETL process. The data transform circuitry 208 may process the data rule to be added to the ETL process, including cleaning, formatting, compiling, transforming, or the like. The data transform circuitry 208 may perform processing on the data rule to make the data rule compliant to the ETL process or any other requirements associated with the ETL process. In some embodiments, the data rule may be deployed to a server, container, or other setting where the ETL process is executed. In some embodiments, the complete set of data rules that make up the ETL process may be collected together including the new data rule, and the entire collected set of ETL rules may be deployed to update the ETL process.

As shown by decision block 506, control may flow to operation 508 depending on a determination of whether the data rule is flagged as invalid by the user. The indication of human validation may be received, for example, at operation 310, described in connection with FIG. 3. In an instance in which the indication of human validation is received and the data rule is flagged as invalid by the user, control may move to operation 508.

As shown by operation 508, the apparatus 200 includes means, such as processor 202, memory 204, communications hardware 206, data transform circuitry 208, or the like, for, in an instance in which the human validation identifies the rule as invalid, discarding the data rule. The data rule may be discarded, or designated as a rule not to be added to the ETL process. In some embodiments, the rule itself may be deleted, or the rule may be stored for later retrieval, for example, if the rule is manually enabled at a later time. In some embodiments, the data rule may be deleted, but a checksum, fingerprint, metadata, or other remnants of the data rule may be retained for record keeping and/or for comparing with future data rules.

Figure 6:
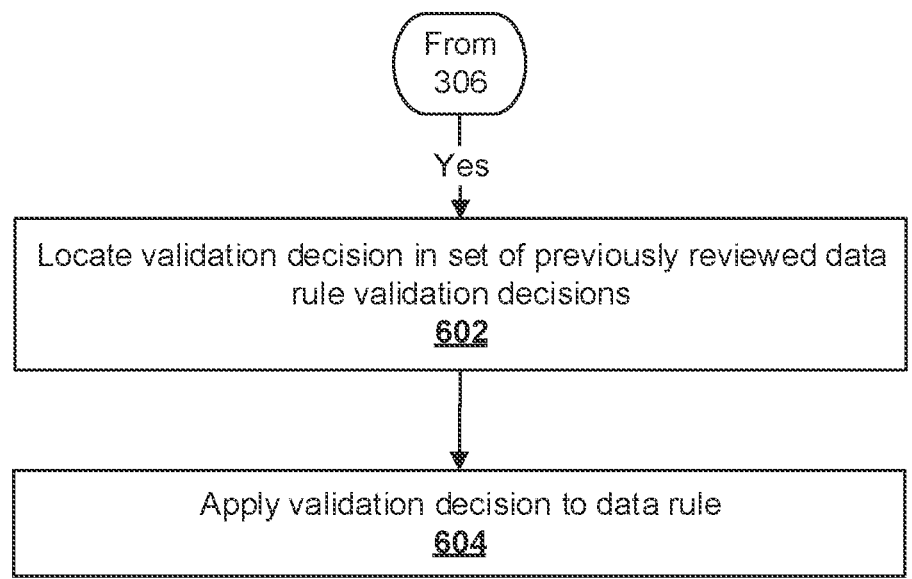
FIG. 6 illustrates another example flowchart for updating a data rule in an instance in which the data rule belongs to a set of previously-reviewed data rules, in accordance with some example embodiments described herein.

Turning now to FIG. 6, example operations are shown for updating a data rule in an event in which the data rule belongs to a set of previously-reviewed data rules. As shown by operation 602, the apparatus 200 includes means, such as processor 202, memory 204, communications hardware 206, rule validation circuitry 210, or the like, for locating a validation decision in the set of previously reviewed data rule validation decisions. The validation decision may be related to the data rule. For example, a user may previously provide an indication that a particular data rule is valid. The decision that the particular data rule is valid may be stored, by memory 204 or other storage, and located by the rule validation circuitry 210 is the same particular data rule is evaluated at a later time.

As shown by operation 604, the apparatus 200 includes means, such as processor 202, memory 204, communications hardware 206, rule validation circuitry 210, or the like, for applying the validation decision to the data rule. For example, if the user previously provided an indication that the particular data rule is valid, upon retrieving the previously made decision in operation 602, the validation decision may be applied again to the particular data rule, and the particular data rule may be marked as valid. The particular data rule marked as valid by the user may be processed, for example, according to operation 504 after determining in decision block 502 that the particular data rule is valid.

Figure 7A:
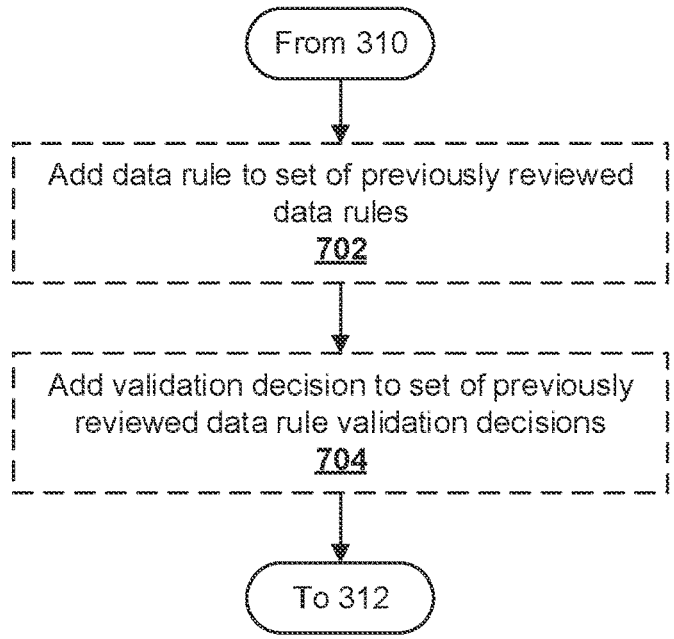
FIG. 7A illustrates another example flowchart for updating a set of previously-reviewed data rules, in accordance with some example embodiments described herein.

Turning now to FIG. 7A, example operations are shown for updating a set of previously-reviewed data rules. As shown by operation 702, the apparatus 200 may include means, such as processor 202, memory 204, communications hardware 206, rule validation circuitry 210, or the like, for adding the data rule to the set of previously reviewed data rules. The rule validation circuitry 210 may retrieve the set of previously reviewed data rules, for example, from memory 204 or other storage. The rule validation circuitry 210 may then append, re-write, or otherwise update the set of previously reviewed data rules to include the new data rule. The updated set of previously reviewed data rules may then be stored to memory 204 or other storage for later update or retrieval. In some embodiments, a hash or checksum of the data rule may be stored rather than the entire data rule. In some embodiments, metadata or certain information derived from the data rule may be stored with or in place of the data rule itself.

As shown by operation 704, the apparatus 200 may include means, such as processor 202, memory 204, communications hardware 206, rule validation circuitry 210, or the like, for adding a validation decision to the set of previously reviewed data rule validation decisions. The rule validation circuitry 210 may retrieve the set of previously reviewed data rule validation decisions, for example, from memory 204 or other storage. The rule validation circuitry 210 may then append, re-write, or otherwise update the set of previously reviewed data rule decisions to include the new data rule decision (e.g., if the data rule is determined to be valid, invalid, or ambiguous). The updated set of previously reviewed data rule decisions may then be stored to memory 204 or other storage for later update or retrieval. In some embodiments, a hash or checksum of the data rule associated with the data rule decision may be stored. In some embodiments the set of previously reviewed data rule decisions may be stored together (e.g., in the same database or list) as the set of previously reviewed data rules.

Figure 7B:
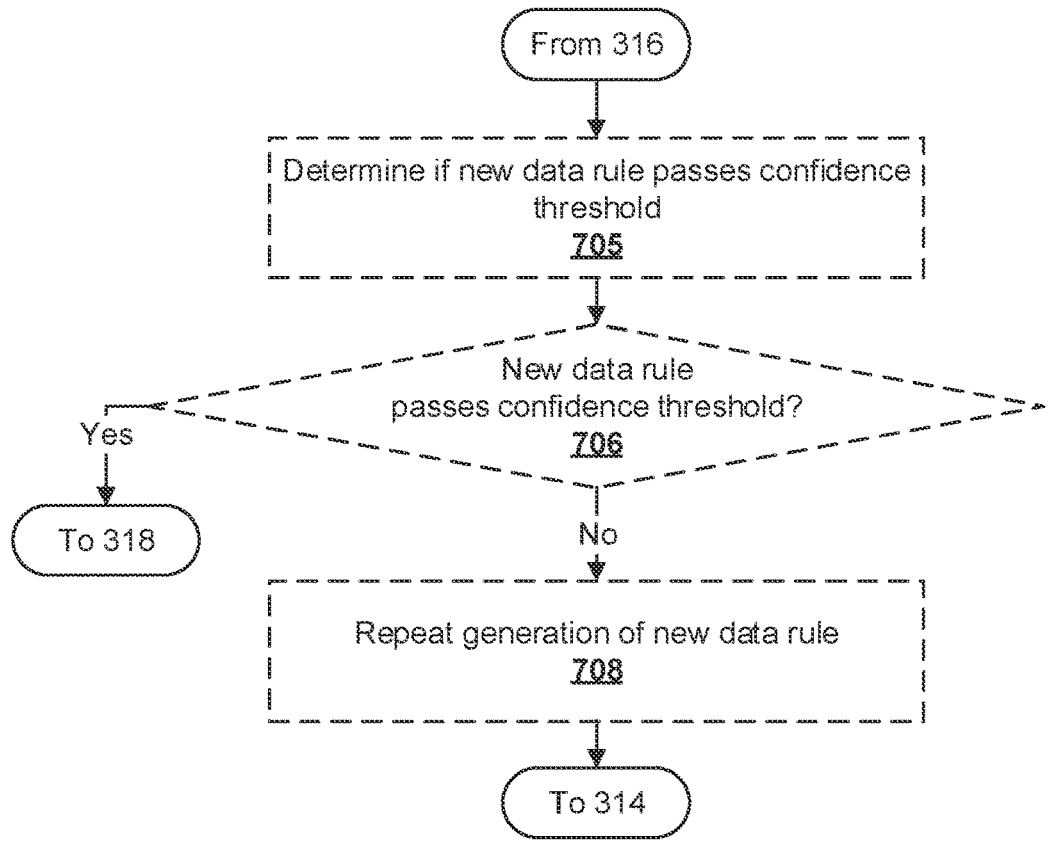
FIG. 7B illustrates another example flowchart for repeating an update of an element of a machine learning model, in accordance with some example embodiments described herein.

Turning now to FIG. 7B, example operations are shown for repeating an update of an element of a machine learning model. As shown by operation 704, the apparatus 200 may include means, such as processor 202, memory 204, communications hardware 206, rule generation circuitry 212, or the like, determining that the new data rule passes or does not pass a confidence threshold. In some embodiments, the machine learning model may produce a confidence score together with a new data rule. The rule generation circuitry 212 may impose a threshold on the confidence score. In some embodiments, the rule generation circuitry 212 may reject any new data rule that is produce with a confidence score below the confidence threshold. In some embodiments, the rule generation circuitry 212 may generate the confidence score by itself and determine if the associated new data rule passes the confidence threshold. The confidence threshold may be pre-determined and chosen by a user, or assigned to a default value. Lower confidence thresholds may provide faster processing times, while larger confidence thresholds may provide more accurate results, but may also come with a possibility of overspecializing or overtraining.

As shown by decision block 706, control may flow to operation 318 or operation 708 depending on an indication that the new data rule passes or does not pass the confidence threshold. The determination of whether the new data rule passes or does not pass the confidence threshold may be determined, for example, in operation 705. If the new data rule does pass the confidence threshold, control may move to operation 318 in FIG. 3. If the new data rule does not pass the confidence threshold, control may pass to operation 708, described below.

As shown by operation 708, the apparatus 200 may include means, such as processor 202, memory 204, communications hardware 206, data transform circuitry 208, rule validation circuitry 210, rule generation circuitry 212, or the like, for, upon determining that the new data rules does not pass a confidence threshold, repeating generation of the new data rule. The rule generation circuitry 212 may direct the apparatus 200 to generate a new data rule. The repeated generation of the new data rule may proceed, for example, according to operation 316 of FIG. 3. It will be understood that the repeated generation of the new data rule may, in some embodiments, be followed by another evaluation of the new data rule as to whether it passes or fails the confidence threshold, as described in connection with operation 704 of FIG. 7B, FIGS. 3-7B illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be implemented by execution of software instructions. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a non-transitory computer-readable memory that may direct a computing device or other programmable apparatus to function in a particular manner, such that the software instructions stored in the computer-readable memory comprise an article of manufacture, the execution of which implements the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

In some embodiments, some of the operations described above in connection with FIGS. 3-7B may be modified or further amplified. Furthermore, in some embodiments, additional optional operations may be included. Modifications, amplifications, or additions to the operations above may be performed in any order and in any combination.

CONCLUSION

As described above, example embodiments provide methods and apparatuses that enable improved generation of data rules, for example, in an ETL or ELT process. Example embodiments thus provide tools that overcome the problems faced by users of ETL processes, particularly ETL processes with large and complex sets of data rules that are difficult to modify and/or automate. Moreover, embodiments described herein avoid over-reliance on automated processes by incorporating a human in the loop to validate automated decisions and ensure data quality.

As these examples all illustrate, example embodiments contemplated herein provide technical solutions that solve real-world problems faced during creation and upkeep of ETL/ELT processes. And while maintaining ETL/ELT processes has been an issue for decades, the recently exploding amount of data made available by recently emerging technology today has made this problem significantly more acute, as the demand for high quality data has grown significantly even while the complexity of business and other organizational needs have themselves increased. At the same time, the recently arising ubiquity of machine learning has unlocked new avenues to solving this problem that historically were not available, and example embodiments described herein thus represent a technical solution to these real-world problems.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for dynamically generating a new data rule, the method comprising:
   receiving, by data transform circuitry, a data rule, wherein the data rule comprises an operation to be applied to a data entry, wherein the data rule is generated using a machine learning model, wherein the data rule corresponds to an element of the machine learning model, wherein the data rule belongs to an ETL process from a set of ETL processes;
   making a determination, by rule validation circuitry, regarding whether the data rule belongs to a set of previously-reviewed data rules;
   in an instance in which the determination indicates that the data rule does not belong to the set of previously-reviewed data rules, providing, by the rule validation circuitry, the data rule to a user for human validation;
   receiving, by the rule validation circuitry, an indication of human validation of the data rule from the user, wherein the human validation indicates one item from a list comprising "valid," "invalid," and "ambiguous," wherein "ambiguous" indicates allowing automated updating of the data rule;
   performing, by rule generation circuitry and based on the indication of human validation, an optimization operation using the new data rule, wherein performing the optimization comprises, in an instance in which the human validation indicates "ambiguous":
   causing an update, by rule generation circuitry, of the element of the machine learning model corresponding to the data rule, wherein the machine learning model comprises a weight value, wherein the update changes the weight value based on the indication of human validation, wherein causing an update of the element of the machine learning model results in an updated machine learning model;
   modifying, by the rule generation circuitry, the machine learning model based on the set of ETL processes and a set of quality scores associated with the set of ETL processes;
   generating, by the rule generation circuitry, the new data rule based on the updated machine learning model;
   determining, by the rule generation circuitry, whether the new data rule passes a confidence threshold; and
   in an instance in which the new data rule passes the confidence threshold, replacing, by the data transform circuitry and based on determining that the new data rule passes the confidence threshold, the data rule with the new data rule.

2. The method of claim 1, wherein the rule validation circuitry comprises a field programmable gate array.

3. The method of claim 1, wherein the data rule belongs to an extract-transform-load (ETL) process, the method further comprising:
   training, by the rule generation circuitry, a machine learning model using existing data rules from existing ETL processes.

4. The method of claim 1, wherein performing the optimization operation using the new data rule further comprises, in an instance in which the human validation indicates "ambiguous":
   in an instance in which the new data rule does not pass the confidence threshold, repeating generation of the new data rule.

5. The method of claim 1, wherein causing the update of the element of the machine learning model comprises:
   receiving, by the rule generation circuitry, the set of ETL processes; and
   assigning, by the rule generation circuitry, a quality score from the set of quality scores to each ETL process from the set of ETL processes.

6. The method of claim 1, wherein the data rule belongs to an ETL process, wherein performing the optimization operation using the new data rule comprises, in an instance in which the human validation identifies the data rule is valid, adding, by the data transform circuitry, the data rule to the ETL process.

7. The method of claim 1, wherein performing the optimization operation using the new data rule comprises, in an instance in which the human validation identifies the data rule as invalid, discarding, by the data transform circuitry, the data rule.

8. The method of claim 1,
   wherein the set of previously-reviewed data rules is continually updated upon reviewing a subsequent data rule,
   wherein a set of previously reviewed data rule validation decisions is stored and continually updated upon receiving a subsequent indication of human validation.

9. The method of claim 8, further comprising, in an instance in which the data rule belongs to the set of previously reviewed data rules:
   locating, by the rule validation circuitry, a validation decision in the set of previously reviewed data rule validation decisions, wherein the validation decision is related to the data rule; and
   applying, by the rule validation circuitry, the validation decision to the data rule.

10. An apparatus for dynamically generating a new data rule, the apparatus comprising:
    data transform circuitry configured to receive a data rule, wherein the data rule comprises an operation to be applied to a data entry, wherein the data rule is generated using a machine learning model, wherein the data rule corresponds to an element of the machine learning model, wherein the data rule belongs to an ETL process from a set of ETL processes;

rule validation circuitry configured to:
  make a determination regarding whether the data rule belongs to a set of previously-reviewed data rules,
  in an instance in which the determination indicates that the data rule does not belong to the set of previously-reviewed data rules, provide the data rule to a user for human validation, and
  receive an indication of human validation of the data rule from the user wherein the human validation indicates one item from a list comprising "valid," "invalid," and "ambiguous," wherein "ambiguous" indicates allowing automated updating of the data rule; and
rule generation circuitry configured to perform an optimization operation based on the indication of human validation and using the new data rule,
wherein the rule generation circuitry is configured such that performing the optimization operation further comprises, in an instance in which the human validation indicates "ambiguous":
  causing an update of an element of a machine learning model, wherein the element corresponds to the data rule, wherein the update changes a weight value based on the indication of human validation, wherein causing an update of the element of the machine learning model results in an updated machine learning model;
  modifying the machine learning model based on the set of ETL processes and a set of quality scores associated with the set of ETL processes;
  generating the new data rule based on the updated machine learning model;
  determining whether the new data rule passes a confidence threshold; and
  in an instance in which the new data rule passes the confidence threshold, replacing, based on determining that the new data rule passes the confidence threshold, the data rule with the new data rule.

11. The apparatus of claim 10, wherein the rule validation circuitry comprises a field programmable gate array.

12. The apparatus of claim 10, wherein the data rule belongs to an extract-transform-load (ETL) process.

13. The apparatus of claim 12, wherein the rule generation circuitry is further configured to train a machine learning model using existing data rules from existing ETL processes.

14. The apparatus of claim 10, wherein the rule generation circuitry is further configured so that causing the update of the element of the machine learning model comprises:
  receiving the set of ETL processes; and
  assigning a quality score from the set of quality scores to each ETL process from the set of ETL processes.

15. The apparatus of claim 10, wherein the data rule belongs to an ETL process, wherein the data transform circuitry is configured so that performing the optimization operation using the new data rule comprises, in an instance in which the human validation identifies the data rule is valid, adding the data rule to the ETL process.

16. The apparatus of claim 10, wherein the data transform circuitry is configured so that performing the optimization operation using the new data rule comprises, in an instance in which the human validation identifies the data rule as invalid, discarding the data rule.

17. A computer program product for dynamically generating a new data rule, the computer program product comprising at least one non-transitory computer-readable storage medium storing software instructions that, when executed, cause an apparatus to:
  receive a data rule, wherein the data rule comprises an operation to be applied to a data entry, wherein the data rule belongs to an ETL process from a set of ETL processes;
  make a determination regarding whether the data rule belongs to a set of previously-reviewed data rules;
  in an instance in which the determination indicates that the data rule does not belong to the set of previously-reviewed data rules, provide the data rule to a user for human validation;
  receive an indication of human validation of the data rule from the user, wherein the human validation indicates one item from a list comprising "valid," "invalid," and "ambiguous," wherein "ambiguous" indicates allowing automated updating of the data rule; and
  in an instance in which the human validation indicates "ambiguous":
    cause an update of an element of a machine learning model, wherein the element corresponds to the data rule, wherein the update changes a weight value based on the indication of human validation, wherein causing an update of the element of the machine learning model results in an updated machine learning model,
    modify the machine learning model based on the set of ETL processes and a set of quality scores associated with the set of ETL processes,
    generate the new data rule based on the updated machine learning model,
    determine whether the new data rule passes a confidence threshold, and
    in an instance in which the new data rule passes the confidence threshold, replace, based on determining that the new data rule passes the confidence threshold, the data rule with the new data rule.

18. The computer program product of claim 17, wherein the data rule belongs to an extract-transform-load (ETL) process.

19. The computer program product of claim 18, wherein the software instructions further cause the apparatus to:
  train the machine learning model using existing data rules from existing ETL processes.

* * * * *